(12) United States Patent
Huysegems et al.

(10) Patent No.: US 10,116,879 B2
(45) Date of Patent: Oct. 30, 2018

(54) METHOD AND APPARATUS FOR OBTAINING AN IMAGE WITH MOTION BLUR

(71) Applicant: Alcatel Lucent, Boulogne, Billancourt (FR)

(72) Inventors: Rafael Huysegems, Antwerp (BE); Marc Godon, Antwerp (BE)

(73) Assignee: Alcatel Lucent, Boulogne, Billancourt (FR)

( * ) Notice: Subject to any disclaimer, the term of this patent is extended or adjusted under 35 U.S.C. 154(b) by 0 days.

(21) Appl. No.: 15/303,796

(22) PCT Filed: Apr. 9, 2015

(86) PCT No.: PCT/EP2015/057667
§ 371 (c)(1),
(2) Date: Oct. 13, 2016

(87) PCT Pub. No.: WO2015/158590
PCT Pub. Date: Oct. 22, 2015

(65) Prior Publication Data
US 2017/0034429 A1 Feb. 2, 2017

(30) Foreign Application Priority Data

Apr. 14, 2014 (EP) ..................................... 14305544

(51) Int. Cl.
*H04N 5/262* (2006.01)
*H04N 5/272* (2006.01)
(Continued)

(52) U.S. Cl.
CPC ........... *H04N 5/2625* (2013.01); *G06T 7/579* (2017.01); *H04N 5/2356* (2013.01);
(Continued)

(58) Field of Classification Search
CPC .. H04N 5/2625; H04N 5/2355; H04N 5/2356; H04N 5/3535; H04N 5/3554;
(Continued)

(56) References Cited

U.S. PATENT DOCUMENTS 6,556,784 B2 4/2003 Onuki
8,704,900 B2 4/2014 Watanabe et al.
(Continued)

FOREIGN PATENT DOCUMENTS

CN 101331754 A 12/2008
CN 101504765 A 8/2009
(Continued)

OTHER PUBLICATIONS

International Search Report for PCT/EP2015/057667 dated Jul. 16, 2015.

*Primary Examiner* — Paul Berardesca
(74) *Attorney, Agent, or Firm* — Fay Sharpe LLP

(57) ABSTRACT

Method for obtaining an image containing a portion with motion blur, comprising: controlling at least one camera to take a first, second and third picture in a determined order of an object and a background, such that said first picture is taken with a first exposure time, said second picture with a second exposure time, and said third picture with a third exposure time, said second exposure time being longer than said first and said third exposure time, such that said second picture contains a blurred image of the background and/or the object if said object and/or said background is moving with respect to said at least one camera; generating a final image containing at least a portion of said blurred image of the second picture as well as well as a portion derived from said first and/or third picture, using said first, second and third picture.

16 Claims, 10 Drawing Sheets

(51) Int. Cl.
*H04N 5/232* (2006.01)
*H04N 5/235* (2006.01)
*G06T 7/579* (2017.01)

(52) U.S. Cl.
CPC ..... *H04N 5/23216* (2013.01); *H04N 5/23232* (2013.01); *H04N 5/272* (2013.01); *G06T 2207/20221* (2013.01)

(58) Field of Classification Search
CPC ...... H04N 5/35581; G06T 2207/10144; G06T 2207/20221; G06T 7/579
See application file for complete search history.

(56) References Cited

U.S. PATENT DOCUMENTS

| | | |
|---|---|---|
| 9,357,139 B2 | 5/2016 | Tatsumi |
| 2005/0047672 A1 | 3/2005 | Ben-Ezra et al. |
| 2006/0017837 A1 | 1/2006 | Sorek et al. |
| 2012/0002899 A1* | 1/2012 | Orr, IV .................. G06T 5/50 382/282 |
| 2012/0188394 A1* | 7/2012 | Park .................. H04N 5/23212 348/222.1 |
| 2013/0182756 A1 | 7/2013 | Furlan |

FOREIGN PATENT DOCUMENTS

| | | |
|---|---|---|
| EP | 2 242 021 A1 | 10/2010 |
| JP | 2000-194030 | 7/2000 |
| JP | 2007-074031 | 3/2007 |
| JP | 2011-221924 | 11/2011 |
| JP | 2012-100000 | 5/2012 |

\* cited by examiner

METHOD AND APPARATUS FOR OBTAINING AN IMAGE WITH MOTION BLUR

FIELD OF INVENTION

The field of the invention relates to photography. Particular embodiments relate to a method and apparatus for obtaining an image containing a portion with motion blur, to a computer program, to a controller, and to a data storage device encoding a program to perform the method.

BACKGROUND

In photography, motion blur is often used to give an impression of action and speed in a standstill image. However, in most cases only few, typically professional photographers reach a camera handling level and expertise that truly enables them to include motion blur in a controlled way in a picture.

In addition, using prior art techniques, it is difficult and time-consuming to introduce a convincing and natural motion blur through after-processing of a picture using e.g. Photoshop, GIMP, etc.

SUMMARY

The object of embodiments of the invention is to allow inexperienced photographers to obtain images containing motion blur in a controlled way. More in particular, the object of embodiments of the invention is to help photographers with a creative use of motion blur in their pictures.

According to a first aspect of the invention, there is provided a method for obtaining an image containing a portion with motion blur. The method comprises controlling at least one camera to take a first, second and third picture of at least an object and a background; and generating a final image using said first, second and third picture. The first picture is taken with a first exposure time, the second picture with a second exposure time and the third picture with a third exposure time. The second exposure time is longer than the first and the third exposure time, and is such that the second picture contains a blurred image of said background and/or said object. The controlling of the at least one camera is such that the first, second and third pictures are take in a determined order. Note that this order is not necessarily first, then second, and then third, but may also be first, third, second, or any other order. The generating of the final image using the first, second and third picture, is such that the final image contains at least a portion of the blurred image of the second picture, as well as a portion derived from the first and/or third picture.

Embodiments of the invention are based inter alia on the inventive insight that by combining a series of at least three pictures, wherein two of the three pictures have a relatively short exposure time, while one of the pictures has a relatively long exposure time, it is possible to generate an improved final image containing on the one hand a blurred portion of the picture taken with the long exposure time, and on the other hand a sharp image of the remaining portion.

In an embodiment the controlling of the at least one camera comprises controlling a single camera to take the first, second and third picture, wherein the pictures are taken one after the other, preferably keeping the time between the shooting of subsequent pictures as small as possible.

In an embodiment, the controlling comprises controlling the at least one camera such that the third picture is taken after the second picture, and the second picture is taken after the first picture. In that way the first and the third picture will allow to determine the position and shape of the object, and this information can then be used to determine the position and shape of the blurred image in the second picture. Preferably, the time period between the taking of the first picture and the taking of the second picture, and the time period between the taking of the second picture and the taking of the third picture are smaller than 1/100 s, more preferably smaller than 1/300 s. It is noted that those values are typical values for pictures taken using light rays in the visual spectrum. A skilled person understands that different ranges may apply for images obtained using e.g. infrared rays, UV rays, Rontgen rays, ultrasound, an electromagnetic scan, etc.

In a preferred embodiment, the first and third exposure times are smaller than 1/100 s, preferably smaller than 1/300 s. In that way the first and third picture will be substantially free of motion blur. The second exposure time is preferably larger than 1/80 s, more preferably larger than 1/50 s, and most preferably larger than 1/40 s. Again, the skilled person will understand that those values are typical for pictures taken using rays in the visual spectrum. This corresponds with a relatively long second exposure time such that, if the object and/or the background are moving, the second picture will contain a blurred image of the background and/or the object. In a preferred embodiment, the first and third exposure times are at least five times, preferably at least ten times smaller than the second exposure time.

In a preferred embodiment, generating of the final image comprises: using the first and the third picture to determine a shape and a position of the object in said first and said third picture; isolating at least a portion of the blurred image from the second picture, using the position and shape of the object in the first and third picture; combining the isolated at least a portion of the blurred image with a portion derived from the first and/or third picture to obtain the final image. In such embodiments, the position and shape of the object in the first and third picture will allow to determine the position and shape of the blurred image in the second picture, so that at least a portion of the blurred image can be combined with a portion derived from the first and third picture avoiding alignment problems.

Note that in embodiments of the invention, the blurred image in the second picture may be a blurred image of the object or a blurred image of the background. By determining the position and shape of the object in the first and third picture, the contour of the (optionally blurred) object in the second picture can be determined. In case of a blurred object, this contour forms the boundary of the blurred image. In case of a blurred background, this contour corresponds with an inner boundary of the blurred image of the background, while the outer boundary will be the outer boundary of the second picture. Similar considerations apply if the pictures contain more than one object.

In another possible embodiment, the controlling comprises controlling the at least one camera to take the first and third image before the second image, or to take the first and third image after the second image. In such an embodiment, the first and third image may be used to determine a moving speed of the object or background with respect to the at least one camera. This moving speed may then be used to determine the position and shape of the blurred image in the second picture. Note that if the object has not moved between the first and the third image, the moving speed will be zero, and the blurred image will be the background image in the second picture. Optionally, generating of the final image may further comprise deriving a non-blurred image of the object from the first and/or third picture, and overlaying the non-blurred image of the object on the final image.

According to a preferred embodiment, generating of the final image comprises using the first and the third picture to determine a shape and position of the object using stitching based on the object; removing the object from the first and the third picture taking into account the determined shape and position, in order to generate a first and third background image; combining the first and third background image to obtain a combined background image; using the determined position and shape to determine the position and shape of an optionally blurred image of the object in the second picture; and overlaying the optionally blurred image of the second picture on the combined background image taking into account the position of the optionally blurred image in the second picture. Such an embodiment will give good results when the second picture contains a blurred image of a moving object in combination with a stable background.

According to another embodiment, generating of the final image comprises: using the first and third picture to generate a shape and position of the object using stitching based on the object; using the determined position and shape to determine a position and shape of the optionally blurred image of the object in the second picture; deriving a non-blurred image of the object from the first and/or third picture, taking into account the determined shape and position of the object in the first and/or third picture; overlaying the non-blurred image of the object on the second picture taking into account the position of the optionally blurred image of the object in the second picture. Such an embodiment will give good results when the second picture contains a blurred image of a background.

In embodiments of the invention two final images may be generated, a first final image according to a first embodiment disclosed above, e.g. an embodiment which is particularly suitable for a moving object with a stable background, and a second final image according to a second embodiment disclosed above, e.g. an embodiment which is particularly suitable for a moving background. A user may then be presented with both the first and second final image and may choose the best one. In an alternative embodiment, the user may be presented with a selection interface for selecting a "moving object" mode or a "moving background" mode, whereupon the final image is calculated accordingly.

According to a further aspect of the invention, there is provided a computer program comprising computer-executable instructions to perform the method, when the program is run on a computer, according to any one of the steps of any one of the embodiments disclosed above.

According to a further aspect of the invention, there is provided a computer device or other hardware device programmed to perform one or more steps of any one of the embodiments of the method disclosed above. According to another aspect there is provided a data storage device encoding a program in machine-readable and machine-executable form to perform one or more steps of any one of the embodiments of the method disclosed above.

According to another aspect, there is provided an apparatus comprising at least one camera and an embodiment of a data storage device as disclosed above.

According to yet another aspect there is provided a controller. The controller is configured to control at least one camera to take a first, second and third picture of an object and a background. Typically, the picture will be taken when the object and/or the background are moving with respect to the at least one camera. The controller is further configured to control the at least one camera to take the first picture with a first exposure time, the second picture with a second exposure time, and the third picture with a third exposure time, wherein the second exposure time is longer than the first and third exposure time, and such that the second image contains a blurred image of the background and/or the object when the background and/or the object are moving with respect to the at least one camera. Further, the controller is configured to control the at least one camera, such that the first, second and third pictures are taken in a determined order. In that way it is known which picture is taken at which moment in time.

In an embodiment the controller is configured to control a single camera to take the first, second and third picture, such that the first, second and third pictures are taken one after the other.

In an embodiment the controller is configured to control the at least one camera for taking the first and third picture with a first and third exposure time which are smaller than $1/100$ s, preferably smaller than $1/300$ s; and for taking the second picture with a second exposure time which is larger than $1/80$ s, preferably larger than $1/50$ s, more preferably larger than $1/40$ s.

According to another aspect there is provided an image generating module. The image generating module is configured to receive the first, second and third picture and to generate a final image containing at least a portion of the blurred image of the second picture, as well as a portion derived from the first and/or third picture, using the first, second and third picture.

In an embodiment the controller is configured for controlling the at least one camera to take the first and third image before the second image, or the first and third image after the second image. The image generating module may then be configured for using the first and third image to determine a moving speed of the object with respect to the at least one camera; and to use the moving speed to determine the position of the blurred image in the second picture.

In an embodiment the image generating module is configured for using the first and the third picture to determine a shape and a position of the object in said first and said third picture; isolating at least a portion of the blurred image from the second picture, using the position and shape of the object in the first and third picture; and combining the isolated at least a portion of the blurred image with a portion derived from the first and/or third picture to obtain the final image.

In an embodiment the image generating module is configured for using the first and the third picture to determine a shape and position of the object using stitching based on the object; deriving a background image from said first and/or third pictures using the determined shape and/or position of the object in the first and/or third picture; using the determined position in the first and third picture to determine the position of an optionally blurred image of the object in the second picture; and overlaying the optionally blurred image of the second picture on said background image taking into account the position of the optionally blurred portion in the second picture, in order to obtain the final image.

In an embodiment the image generating module is configured for using the first and the third picture to determine a shape and position of the object using stitching based on the object; removing the object from said first and said third picture taking into account the determined shape and position in order to generate a first and third background image;

combining said first and third background image to obtain a combined background image; using the determined position in the first and third picture to determine the position of an optionally blurred image of the object in the second picture; and overlaying the optionally blurred image of the second picture on said combined background image taking into account the position of the optionally blurred portion in the second picture, in order to obtain the final image.

In an embodiment the image generating module is further configured for: deriving a non-blurred image of the object from the first and/or third picture; and overlaying the non-blurred image of the object on the final image.

In an embodiment the image generating module is configured for using the first and the third picture to generate a shape and position of the object using stitching based on the object; deriving a non-blurred image of the object from said first and/or said third picture; using the determined position in said first and third picture to determine the position of an optionally blurred image of the object in the second picture; overlaying the non-blurred image of the object on the second picture taking into account the determined position of the optionally blurred image of the object in the second picture, in order to obtain the final image.

According to yet another aspect there is provided an apparatus comprising at least one camera, a controller according to any one of the embodiments disclosed above, and optionally an image generating module according to any one of the embodiments disclosed above. Also the apparatus may comprise a display device configured for displaying the final image generated by the image generating module. In exemplary embodiments, the apparatus may be a suitably configured smart phone, a suitably configured digital camera, a suitably configured computer with at least one camera, etc. Further, the apparatus may contain a user interface configured for allowing the user to operate the apparatus. The user interface may be configured to allow a user to set the apparatus in a "picture with motion blur" operating modus. The user interface may comprise a button to activate the controller to control the taking of the first, second and third picture when the apparatus is set in the "picture with motion blur" operating modus. The button may be e.g. a virtual button displayed on the display device if the display device comprises a touch screen, or a physical button.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

In still images different types of motion blur can be distinghuished.

Type 1—Unintentionally Moved Camera, Steady Landscape and/or Object(s)

Typically this type of motion blur can be observed when light conditions are poor. In this case, the photographer and/or camera will have to switch to longer shutter speeds to be able to capture enough light. If not mounted on a tripod, the risk is high to get an unintentionally blurred picture.

Type 2—Unintentionally Moved Object, Steady Camera

Also this type of motion blur may happen when light conditions are poor and the photographer and/or camera has to switch to longer shutter speeds. If the object moves while taking a picture, motion blur occurs. In such a situation using a tripod does not help.

Type 3—Sharp Background with Blurred Moving Object(s)

This type of blur is typically generated on purpose, holding the camera still (hand-held) or mounted on a tripod in combination with a relatively slow shutter. By mounting the camera on a tripod unintentional blur of the background can be avoided while using a low shutter speed. However, most hobby photographers do not carry a tripod all the time. Also, setting up tripod and camera takes time. In a worst case scenario, the opportunity to take the photo has vanished when the setup is finished.

Type 4—Sharp Moving Object(s) and Blurred Background

Also this type of blur may be generated on purpose. It is achieved by panning the camera in the same direction and with the same speed as the object(s) is moving, in combination with a relatively slow shutter speed. It may also be achieved if a picture is taken whilst in a moving vehicle and the object(s) is in the vehicle, so that the object does not move with respect to the camera, but the background as seen e.g. though a window moves with respect to the camera. In theory, any camera that supports a slow shutter speed can be used to take such a picture. However, in practice, one needs to be an experienced photographer with a superior sense of motion and speed to shoot this type of motion-blurred images. Less experienced photographers end up with a picture where also the moving object (intended to be sharp) gets some portion of motion-blur.

Figure 1:
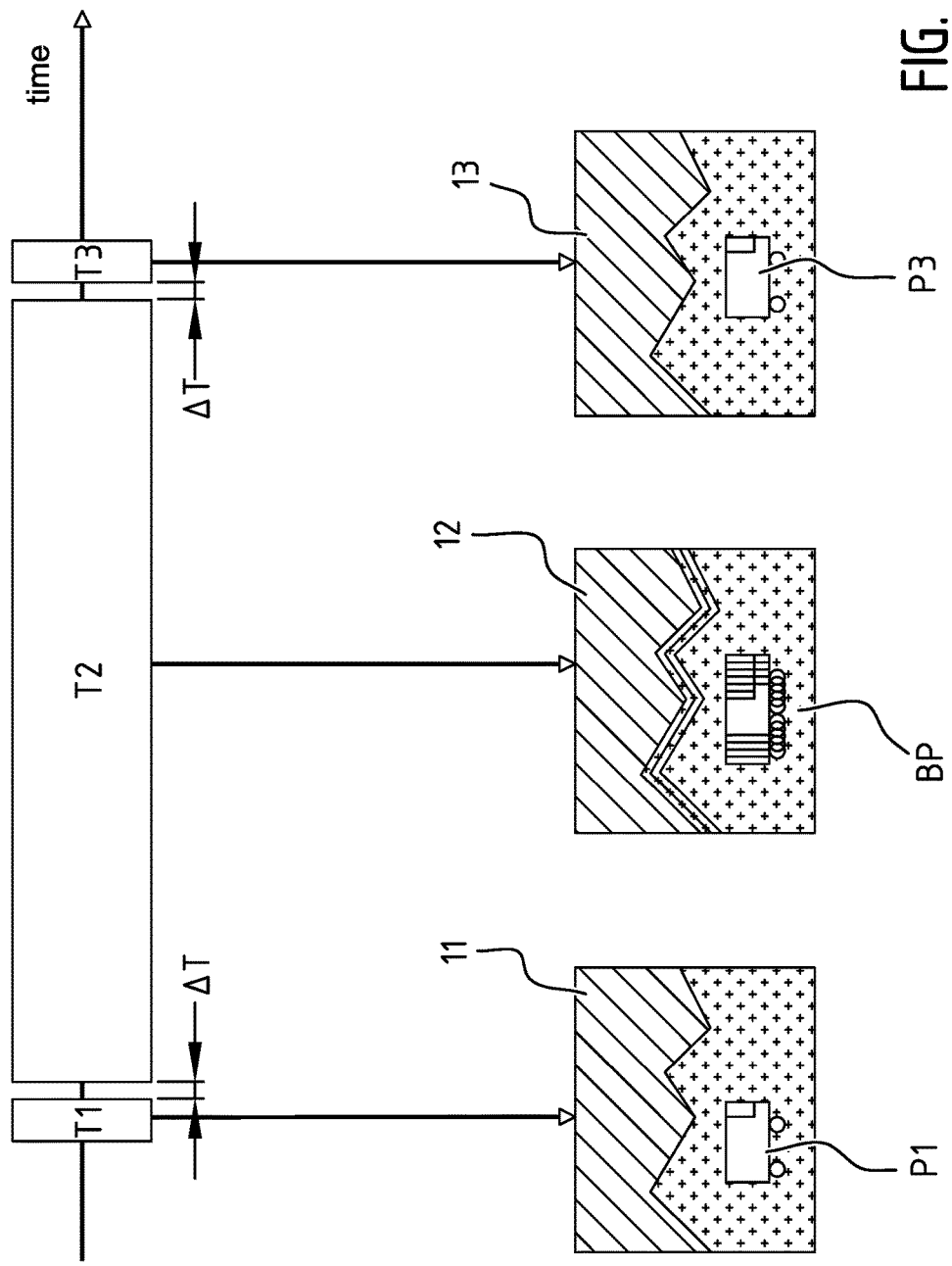
FIG. 1 illustrates schematically a first embodiment of the method.

FIG. 1 illustrates a first embodiment of a method for obtaining a picture containing a portion with motion blur. This embodiment uses a sequence of three pictures 11, 12, 13, shot from the same position within a limited time interval, typically a time interval smaller than 1 s. For an object or background that is moving relatively fast with respect to the camera, this time interval may be relatively short, while for an object or background that is moving relatively slow with respect to the camera this time interval may be relatively long. The exposure timeline depicted in FIG. 1 indicates at which moments the shutter was opened or closed for the creation of the three subsequent pictures 11, 12, 13. The first and the third picture 11, 13 are shot with a short exposure time T1, T3 to avoid any motion blur, while the second picture 12 is shot with a long exposure time T2 with the purpose of introducing motion blur on either a background which moves with respect to the camera (not illustrated in FIG. 1, see FIG. 3) or on one or more object(s) which move with respect to the camera. The latter is illustrated in FIG. 1 for one object in the form of a truck. In the first picture 11 the truck is in position P1 and in the third picture the truck is in position P3. In the second picture the moving truck creates a motion blurred part BP extending between position P1 and position P3.

The three pictures 11, 12, 13 are combined to create one intentionally blurred image in a controlled way. Combining the three pictures, this first embodiment of the method facilitates obtaining an image where a part of the image will appear sharp while another part appears motion blurred. For motion blur of type 3 the background will appear sharper while the object appears motion blurred.

For motion blur of type 4 the moving object will appear sharper while the background appears motion blurred.

The three pictures 11, 12, 13 are created from substantially the same position with respect to the background (type 3) or with respect to the object (type 4). The pictures 11, 12, 13 may either be shot by the same camera or by different cameras in a synchronized way.

The technique to shoot different images with the purpose to create one merged image is also used in HDR photography, commonly available on the high end cameras today, see e.g. http://en.wikipedia.org/wiki/High-dynamic-range_imaging. These cameras shoot different images in a fraction of a second, using different exposures and/or diaphragms. After this step, the camera automatically merges the images to compose one image with a high dynamic range (HDR). However, HDR photography is not capable of dealing with motion blur and does not allow a hobby photographer to obtain an improved image with motion blur.

More in detail, the first embodiment may comprise the following steps. A first step consists of an automatic capturing of three subsequent pictures where the first picture 11 and the third picture 13 have a fast exposure, e.g. an exposure time below ⅓₀₀ s, and the second picture 12 uses a slow exposure, e.g. larger than ¼₀ s. The skilled person will note that the mentioned ranges for the exposure times are merely examples. In specific embodiments, the values for the exposure time may be different. E.g. if the first/third picture is taken with a flashlight, this may be done with an exposure time of ⅟₆₀ s. In that case, it will be the ultra short light pulse of the flash (around ⅟₁₀₀₀ s) that will "freeze" the image. Also, when taking scientific pictures, e.g. pictures taken with a telescope, the exposure time for the first and third picture may be much longer, e.g. larger than ⅟₁₀₀ s. Further, embodiments of the invention are also applicable for pictures taken using infrared rays, UV rays, Rontgen rays, electromagnetic waves, ultrasound, etc. For taking such pictures, exposure times that are significantly different compared to exposure times used for pictures in the visual spectrum, may be used.

The three pictures 11, 12, 13 are either created by the same camera, or by different synchronized cameras on the same location. In a second step the boundaries and the location (position) of the moving object(s) are determined based on the first picture 11 and the third picture 13. This could be done by stitching these pictures 11, 13, aligning on the moving object. In the illustrated example the shape and position P1, P3 of the truck will be determined. In a third step the exposed area of the object(s) in the second picture 12 is determined based on the interpolation of the determined location P1, P3 of the object in the first picture 11 and in the third picture 13. In a further developed embodiment this determination could take into account the small amount of time ΔT between the capturing of the first picture 11 and the second picture 12, and between the capturing of the second picture 12 and the third picture 13. Indeed, since T1, T2, T3 and ΔT are known values, and assuming that the object moves with a constant speed, the exact position and shape of the exposed area of the object may be determined. In practice ΔT may be very small, in which case it may be assumed that positions P1 and P3 form the edges of the exposed area. Irrespective of whether the object is moving with respect to the camera or whether the background is moving with respect to the camera, the knowledge of the determined exposed area of the object may be used to isolate a blurred portion BP of the second picture 12, which blurred portion BP corresponds with the object(s) (as illustrated in FIG. 1) or with the background (not illustrated in FIG. 1, see the discussion below of FIG. 3), respectively. In a fourth step this isolated blurred portion BP is combined with a non-blurred portion derived from the first and the third picture in order to obtain a final image containing motion blur. If it is assumed that the object is moving and the background is stable, the blurred portion may correspond with the exposed area of the object in picture 2, and the non-blurred portion may correspond to a background image obtained by removing the object from the first and/or third picture. If it is assumed that the object is stable (or only moving unintentionally) and the background is moving, the blurred portion may correspond with the background of the picture 2, and the non-blurred portion may correspond to an isolated image of the object(s) extracted from the first and/or third picture.

Figure 2:
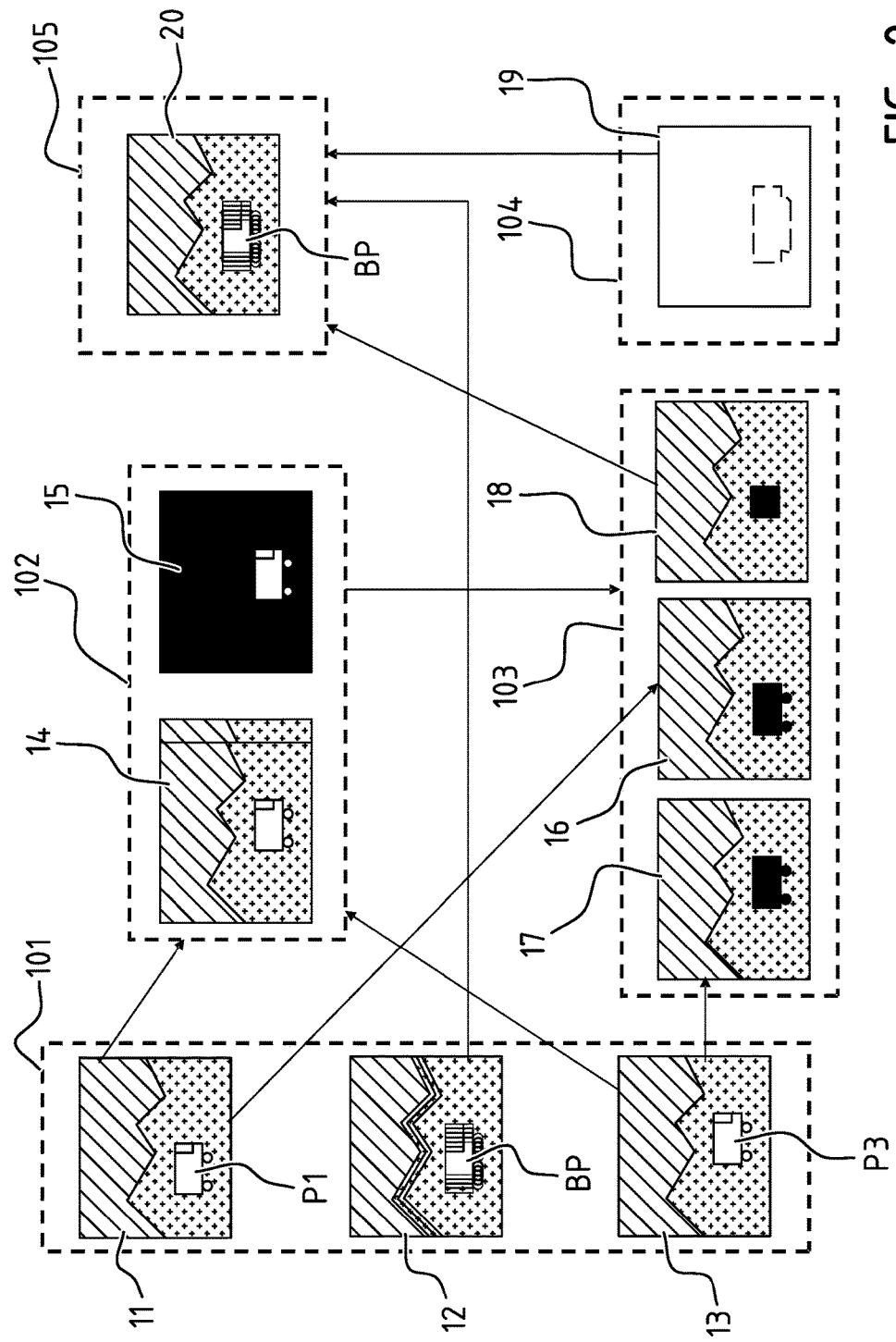
FIGS. 2 and 3 illustrate schematically a second embodiment of the method.
Figure 3:
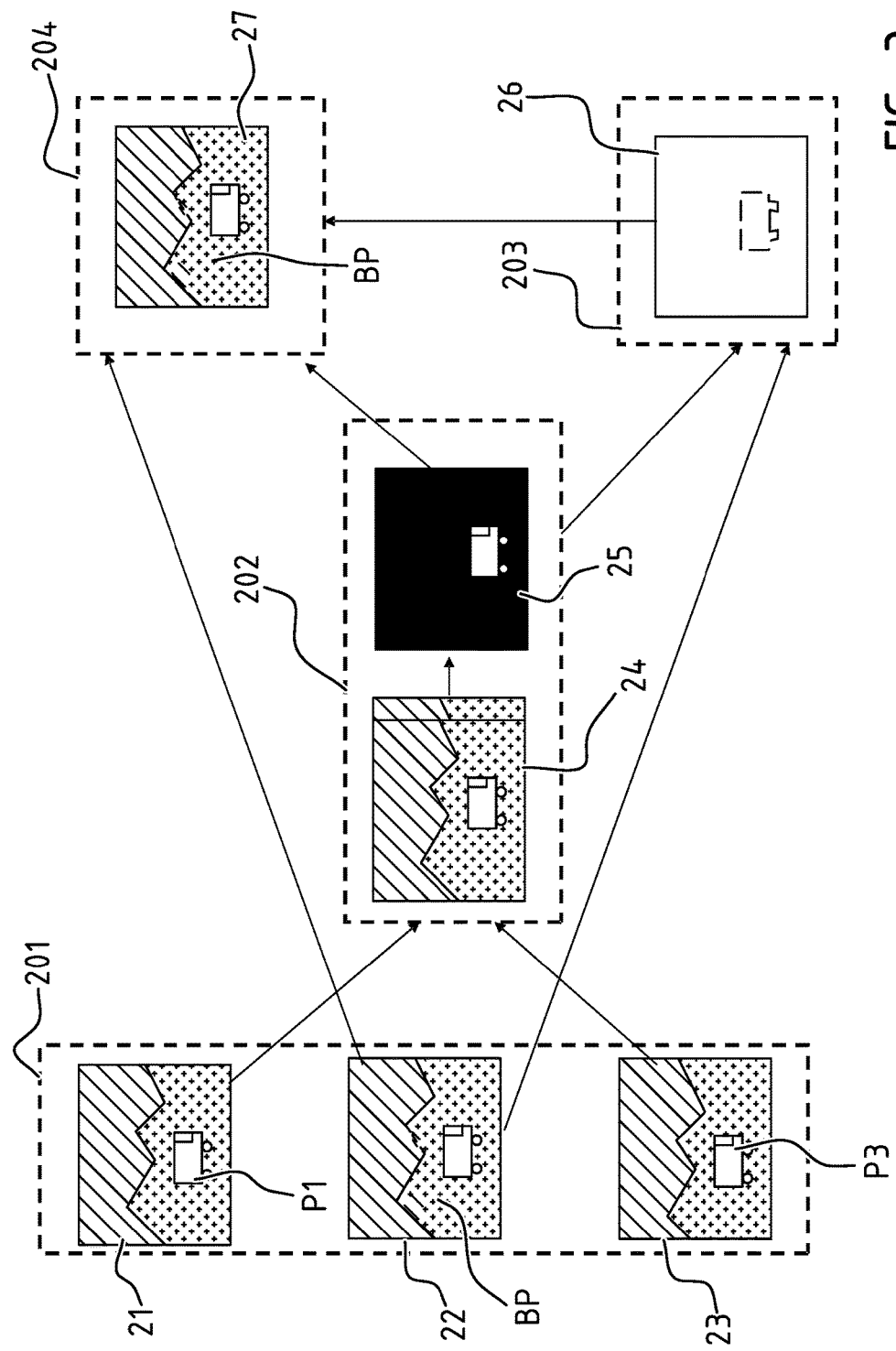

FIGS. 2 and 3 illustrate a second embodiment of a method for obtaining an image with motion blur. This embodiment may be implemented in a camera for still pictures. In the menu of the camera, the user may select an "improved motion blur" setting. In a preferred embodiment the user may also specify the exposure time for the second picture, e.g. ⅟₃₀ s, ⅟₁₅ s, etc. When the camera is triggered to make a picture, it will automatically start a sequence of three pictures 11, 12, 13, see step 101 in FIG. 2 or 21, 22, 23, see step 201 in FIG. 3.

When the three pictures have been shot, the camera will generate two final images 20, 27, see below. Afterwards, the user can select the desired final image. For the first final image, the camera assumes a stable background and a moving object, while for the second final image, it assumes a moving background and a stable object. The example of FIGS. 2 and 3 illustrates the generation of the first and second final image based on a different set of three pictures 11, 12, 13 and 21, 22, 23 while in practice, of course this set of pictures is the same. The example illustrates that for motion blur of type 3 the generation of the first final image may yield a good result, while for motion blur of type 4 the generation of the second final image may yield a good result.

The processing flow for generating the first merged picture 20 is depicted in FIG. 2. In this processing flow, the camera assumes a non-blurred background with a motion-blurred object. In step 102 the first picture 11 and the third picture 13 are stitched. The stitching is done based on the object. To determine the moving object, information from the autofocus system can be used. The exact shape, i.e. the boundary line, of the object is determined by comparing, i.e. stitching the first picture and the third picture, see 14. In a resulting image 15, the stitchable area is extracted from the first and third picture in order to obtain an isolated image of the object.

In an optional step 103 an extended background is generated. Based on the location P1, P3 of the object in the first and third picture as determined in step 102, the object is removed from the first and third picture 11, 13, resulting in images 16 and 17, respectively. These two images are then stitched to form image 18 of the extended background. In this image 18, the hidden area in the landscape due to the passing object is reduced to a minimum. Note that instead of using an extended background image 18 it is also possible to use a background image extracted from only the first picture or from only the second picture, taking into account that ΔT is typically very small, see the discussion above about claim 1.

In step 104, based on the shape and the location of the moving object in the first picture 11 and the third picture 13, a linear interpolation is made to determine where the object was while the exposure was open for capturing the second picture 12. Based on this information the exposed area in the second picture 12 is determined. The exposed area is depicted in image 19 with a dotted line.

In step 105, the extended background image 18 is combined with the blurred portion BP of the second picture 12 according to the position of the exposed area (image 19). This results in a first final image 20 containing motion blur, where the background is completely free of motion-blur (captured with a fast exposure), while the object is motion-blurred (captured with slow exposure) as envisaged by the photographer.

FIG. 3 illustrates the processing flow for the second final picture 27. In this processing flow, the camera assumes a motion-blurred background with a non-blurred object. In step 202 the first and third picture 21, 23 are stitched. The stitching is done based on the object. To determine the moving object, information from the autofocus system can be used. The exact shape of the object is then determined by comparing (stitching) the two images. The stitchable area is extracted from the two pictures 21, 23 in order to get a resulting isolated image 25 of the object.

In step 203, based on the shape and the location of the object in the first and third picture 21, 23, a linear interpolation is made to determine where the object was while the exposure was open for the second picture 22. Based on this information, and the shape of the object, the exposed area in the second picture 22 is determined. The exposed area is depicted in image 26 with a dotted line. In an ideal case, where the camera is moving at exactly the same speed as the object, e.g. a photographer taking a picture of a person on a train with a moving background seen through the window, the position of the object in the first and third picture has not changed. However, in practice also the position of the object may have changed a small amount, causing a small amount of blur in the representation of the object in the second picture.

In step 204 image 25 is placed as an overlay on top of the second picture 22 according to the position of the exposed area (image 26). This results in second final image 27, where the object is completely free of motion-blur (captured with a fast exposure), while the background is motion-blurred (captured with slow exposure) as envisaged by the photographer.

Depending on the pictures 11, 12, 13 or 21, 22, 23 and the intention of the photographer (blur-free object with blurred background or vice versa), only one of the two final images 20, 27 will be successful, i.e. provide the expected result. After the generation of the two final images 20, 27, the photographer will simply select the correct image. The other picture can be removed.

According to a variant of the embodiment of FIGS. 2 and 3, the user is first provided with an interface in which he can select "Type 3—moving object, stable background" motion blur or "Type 4—stable object, moving background" motion blur, whereupon the method of FIG. 2 or the method of FIG. 3 is performed in accordance with the selection of the user.

In another variant the method of the embodiment of FIG. 2 may be used to produce an image 20 with a motion-blurred object and a non-blurred background. On top of this image 20, an additional sharp image of the object (or some part of the object) may be superimposed. The sharp image of the moving object may be generated from the first or the third image, e.g. as derived in step 102.

Figure 4:
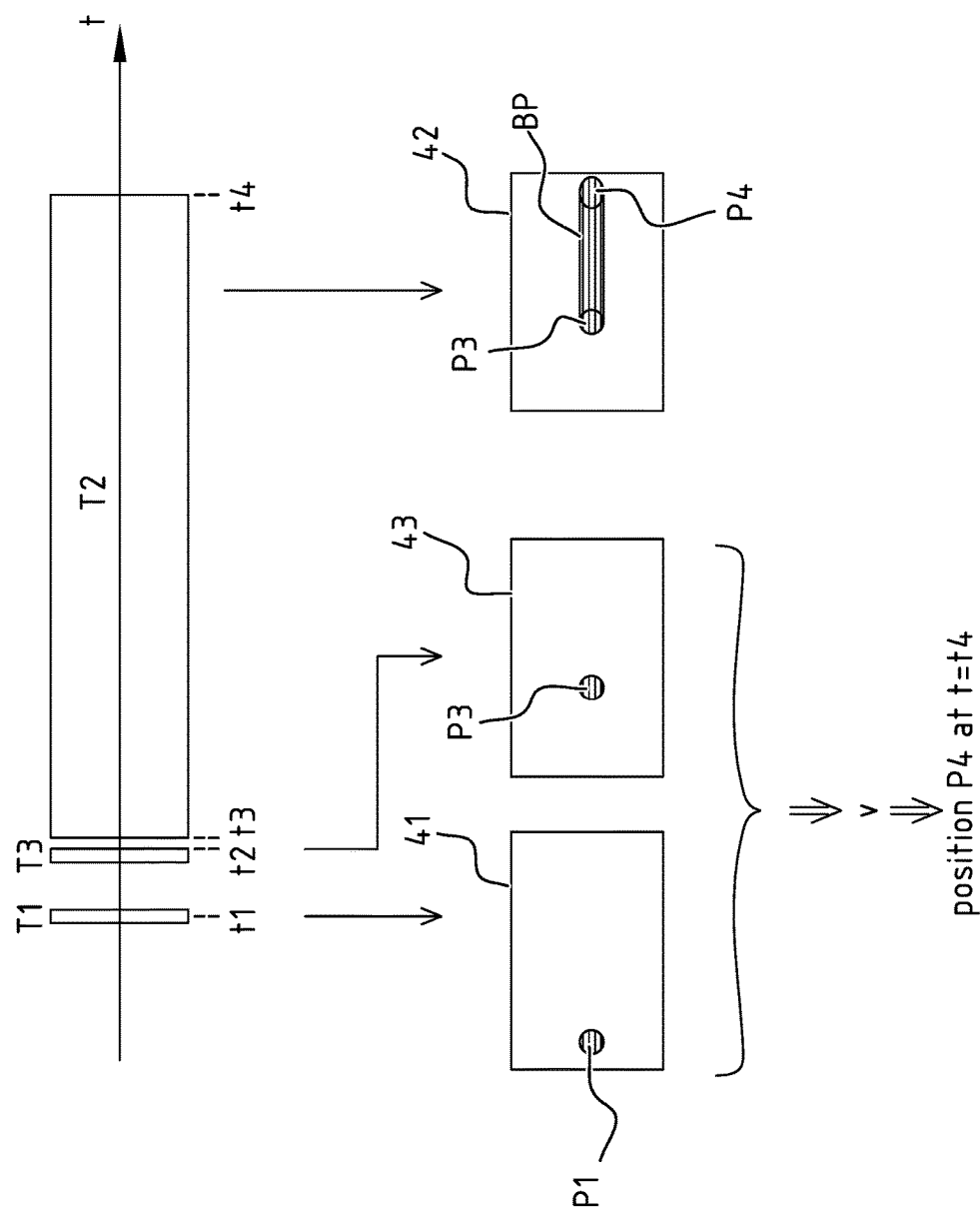
FIG. 4 illustrates schematically a third embodiment of the method.

FIG. 4 illustrates a third embodiment of the method. In the third embodiment, the second picture 42 is taken after the first and third picture 41, 43. As in the first and second embodiment, the first and third pictures 41, 43 are taken with a short exposure time T1, T3, while the second picture 42 is taken with a long exposure time T2. The first and third picture 41, 43 are taken at time t1 and t2, respectively. By stitching the first picture 41 and the third picture 43 on the object, the distance between the object in the first picture 41 and the object in the third picture 43 can be calculated.

Using the time difference (t2−t1) and the calculated distance, the average speed of the object v can be calculated. Using the average speed v, the position P4 of the object at the end time of the exposure for taking the second picture t4, can be determined. If it is assumed that the time period ΔT between the third picture 43 and the second picture 42 is very small, the position P3 of the object at the start t3 of the exposure for taking the second picture may be assumed to be equal to the position of the object in the third picture 43. Such an embodiment of the method will work well as long as the object moves with a more or less constant speed between time t1 and time t4.

In the embodiment of FIG. 4, the final image can be obtained as in FIG. 2 for a situation where it is assumed that the background is stable and the object is moving, with this difference that optional step 103 is omitted. Instead of using an extended background image 18, the background of third picture 43 will be used in the final image, wherein the blurred image BP of the object as extracted from the second picture 42 may be overlaid on the third picture 43.

If in the third embodiment the background were to be moving with respect to the camera instead of the object, then the final image calculated according to the embodiment of FIG. 3 will give a good result. Since in such an embodiment the object is not moving significantly with respect to the camera, computing the speed of the object may be omitted. As for the second embodiment, the two above disclosed methods may be performed in parallel, presenting the user with two final images, whereupon the user may select the final image of his choice.

Figure 5:
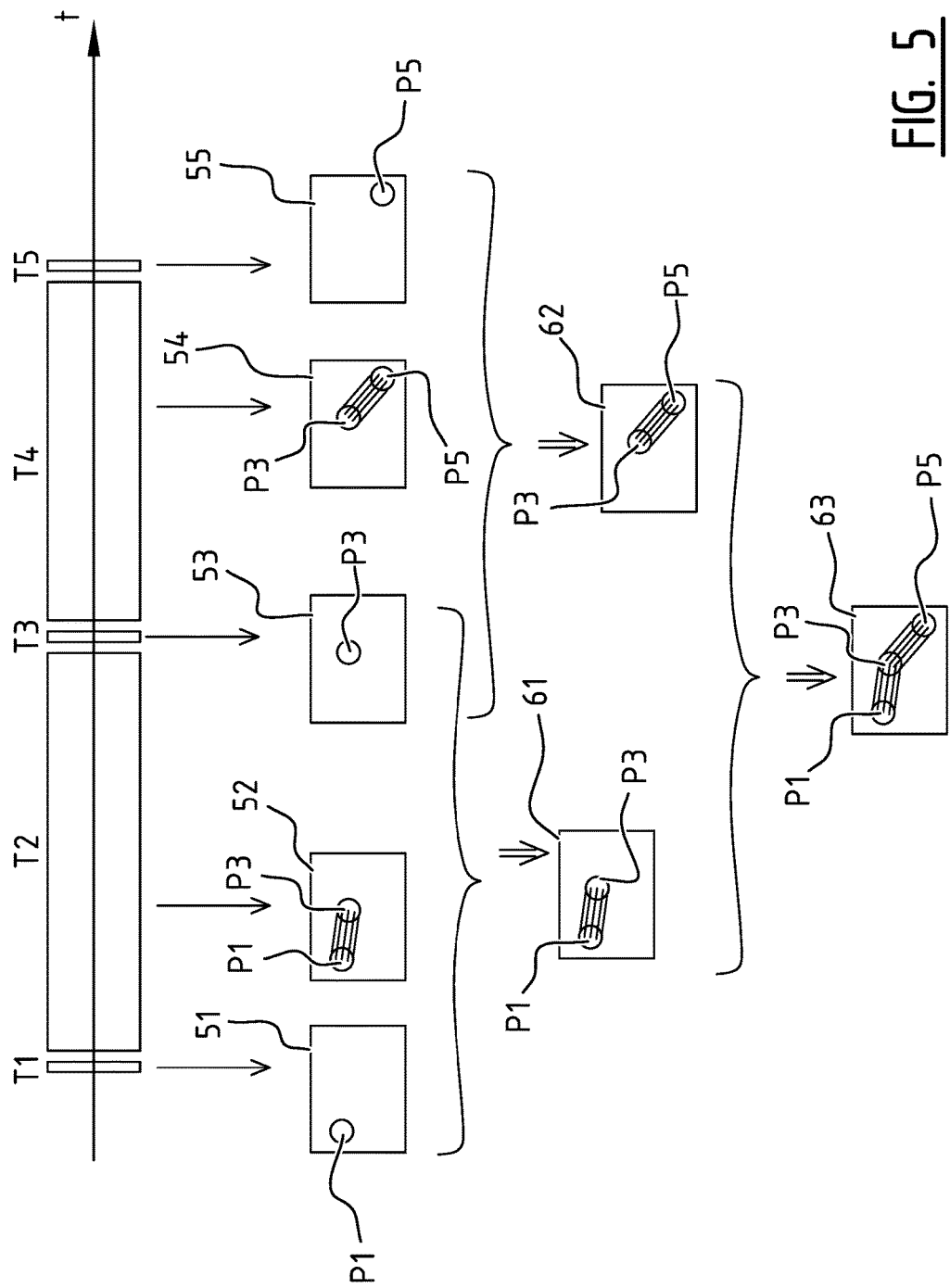
FIG. 5 illustrates schematically a fourth embodiment of the method.

FIG. 5 illustrates a fourth embodiment. This fourth embodiment uses a sequence of five pictures 51-55 taken one after the other. The first picture is taken with a short exposure time T1, the second picture with a long exposure time T2, the third picture with a short exposure time T3, the fourth picture with a long exposure time T4, and the fifth picture with a short exposure time T5. On the basis of the first, second and third pictures 51-53, a first intermediate image 61 may be generated in a way similar to the method disclosed above in connection with FIGS. 1, 2 and 3. The third, fourth and fifth pictures 53-55 may be used to generate a second intermediate image 62, again in a way similar to the method disclosed above in connection with FIGS. 1, 2 and 3. Next, intermediate images 61 and 62 may be combined to obtain a final image 63. Such an embodiment may be useful when the object does not move linearly. If the object moves along a curvature, by using a sequence of pictures with a short and long shutter exposure time, the curvature may be approximated by a series of linear movements. So, also for more complex movements of the object, embodiments of the invention allow to obtain a final image containing motion blur in an improved manner.

Figure 6:
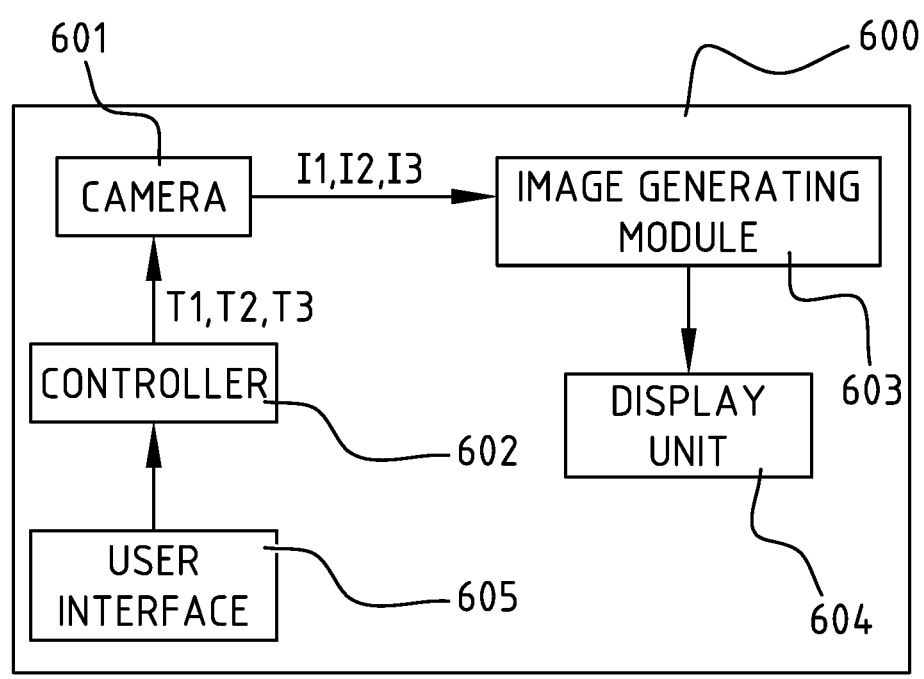
FIG. 6 is a diagram illustrating an embodiment of an apparatus.

FIG. 6 illustrates an embodiment of an apparatus. The apparatus 600 comprises a camera 601, a controller 602, an image generating module 603, and a display unit 604. The camera 601 is controlled by the controller 602 to take a series of subsequent pictures I1, I2, I3 with exposure times T1, T2, T3, respectively. T1 and T3 are short exposure times, which are chosen such that substantially no motion blur appears in pictures I1 and I3. Exposure time T2 is a relatively long exposure time, which is chosen for creating a motion-blurred portion in picture I2. The image generating module 603 is configured for generating a final image containing at least a portion of a blurred part of the second picture I2, as well as a portion derived from the first and/or third picture I1 and I3, using the first, second and third pictures I1, I2, I3. The display unit 604 is configured for displaying the generated final image to a user. Generating the final image by the image generating module 603 may be performed according to any one of the embodiments of the method disclosed above. Also, the image generating module 603 may be configured to generate a plurality of final images according to different embodiments of the method disclosed above, whereupon the display unit may be configured to display the plurality of final images. Further, the apparatus may contain a user interface 605 configured for allowing the user to operate the apparatus. The user interface 605 may be configured to allow a user to set the apparatus in a "picture with motion blur" operating modus. The user interface 605 may comprise a button to activate the controller 602 to control the taking of the first, second and third picture when the apparatus is set in the "picture with motion blur" operating modus. The button may be e.g. a virtual button displayed on the display unit 604 if the display unit 604 comprises a touch screen, or a physical button, e.g. a button of a digital camera.

In exemplary embodiments, the apparatus 600 may be a suitably configured smart phone, a suitably configured digital camera, a suitably configured computer with at least one camera, etc. For completeness it is noted that the controller 602 may be provided as a separate entity or may be integrated with other components of the apparatus. Similarly, the image generating module 603 may be provided as a separate entity or may be integrated with other components of the apparatus.

Figure 7:
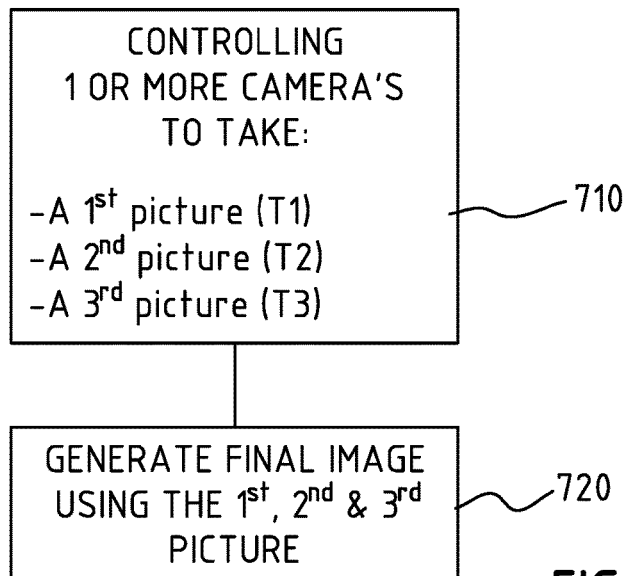
FIG. 7 is a flow chart illustrating an embodiment of the method.

FIG. 7 illustrates en embodiment of a method for obtaining an image containing a portion with motion blur. In a first step 710 at least one camera is controlled to take a first, second and third picture in a determined order of an object and a background, such that said first picture is taken with a first exposure time T1, said second picture with a second exposure time T2, and said third picture with a third exposure time T3, said second exposure time being longer than said first and said third exposure time, such that said second picture contains a blurred image of the background and/or the object if said object and/or said background is moving with respect to said at least one camera. In a second step 720 a final image containing at least a portion of said blurred image of the second picture as well as well as a portion derived from said first and/or third picture, is generated using the first, second and third picture. The controlling step 710 may comprise controlling the at least one camera to take the third picture after the second picture, and the second picture after the first picture. In another embodiment the controlling 710 may comprise controlling the at least one camera to take the first and third image before the second image, or the first and third image after the second image; wherein the first and third image are used to determine a speed of the object with respect to the at least one camera; and wherein the speed is used to determine the position of the blurred image in the second picture. In an exemplary embodiment the first and third exposure time T1, T3 are smaller than ¹⁄₁₀₀ s, and the second exposure time T2 is larger than ¹⁄₈₀ s.

Figure 8:
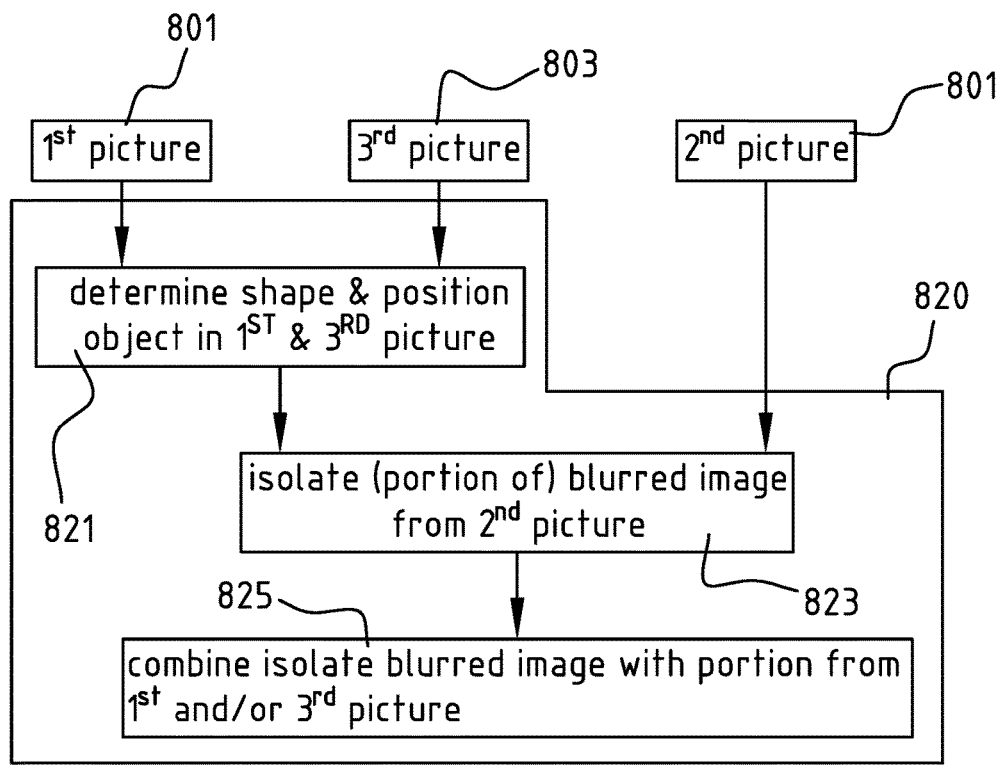
FIG. 8 is a flow chart illustrating an embodiment of the generating step of the method.

FIG. 8 illustrates in detail an exemplary embodiment of the steps that may be performed for generating of the final image. In this embodiment, the step 820 for generating the final image comprises a first step 821 for determining a shape and a position of the object in the first and the third picture, using the first and the third picture 801, 803; a second step 823 for isolating at least a portion of the blurred image from the second picture 802, using the position and shape of the object in the first and third picture; and a third step 825 for combining the isolated at least a portion of the blurred image with a portion derived from the first and/or third picture to obtain the final image.

Figure 9:
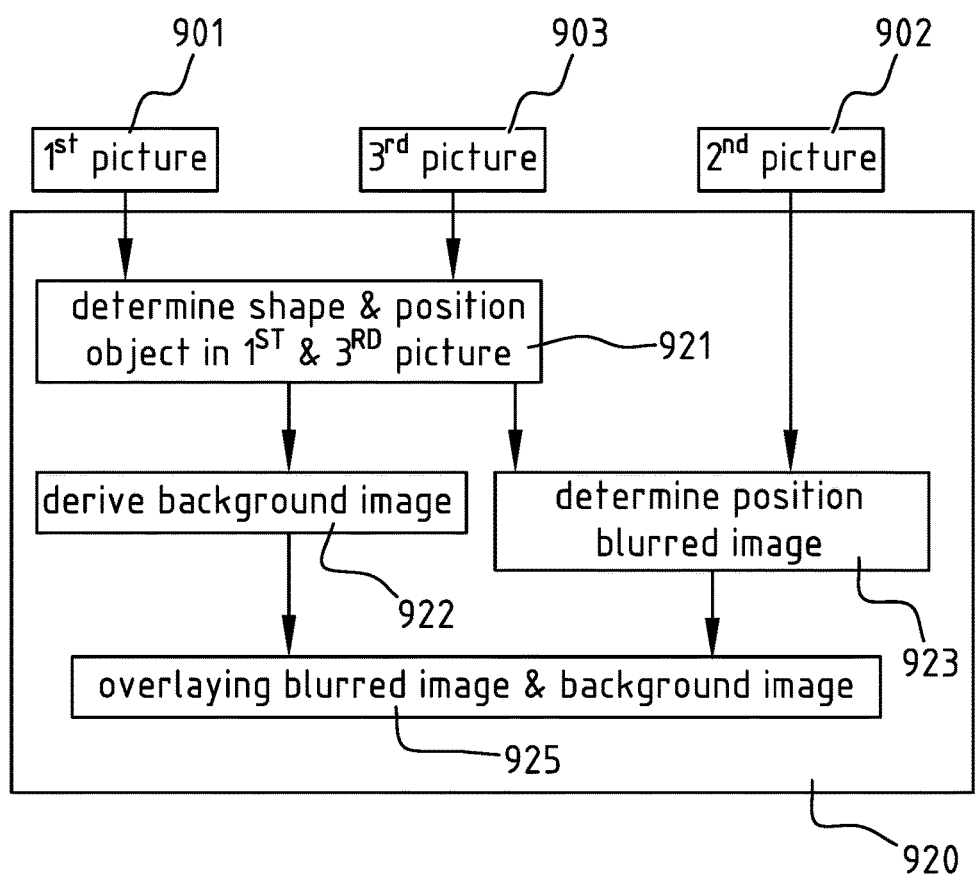
FIG. 9 is a flow chart illustrating an embodiment of the generating step of the method.

FIG. 9 illustrates in detail another exemplary embodiment of the steps that may be performed for generating of the final image. In this embodiment, the step 920 for generating the final image comprises a first step 921 for determining a shape and position of the object using stitching based on the object, using the first and the third picture 901, 903; a second step 922 for deriving a background image from said first and/or third pictures 901, 903 using the determined shape and/or position of the object in the first and/or third picture; a step 923 for determining the position of an optionally blurred image of the object in the second picture 902, using the determined position in the first and third picture; and a final step 925 for overlaying the optionally blurred image of the second picture on said background image taking into account the position of the optionally blurred portion in the second picture, in order to obtain the final image.

Figure 10:
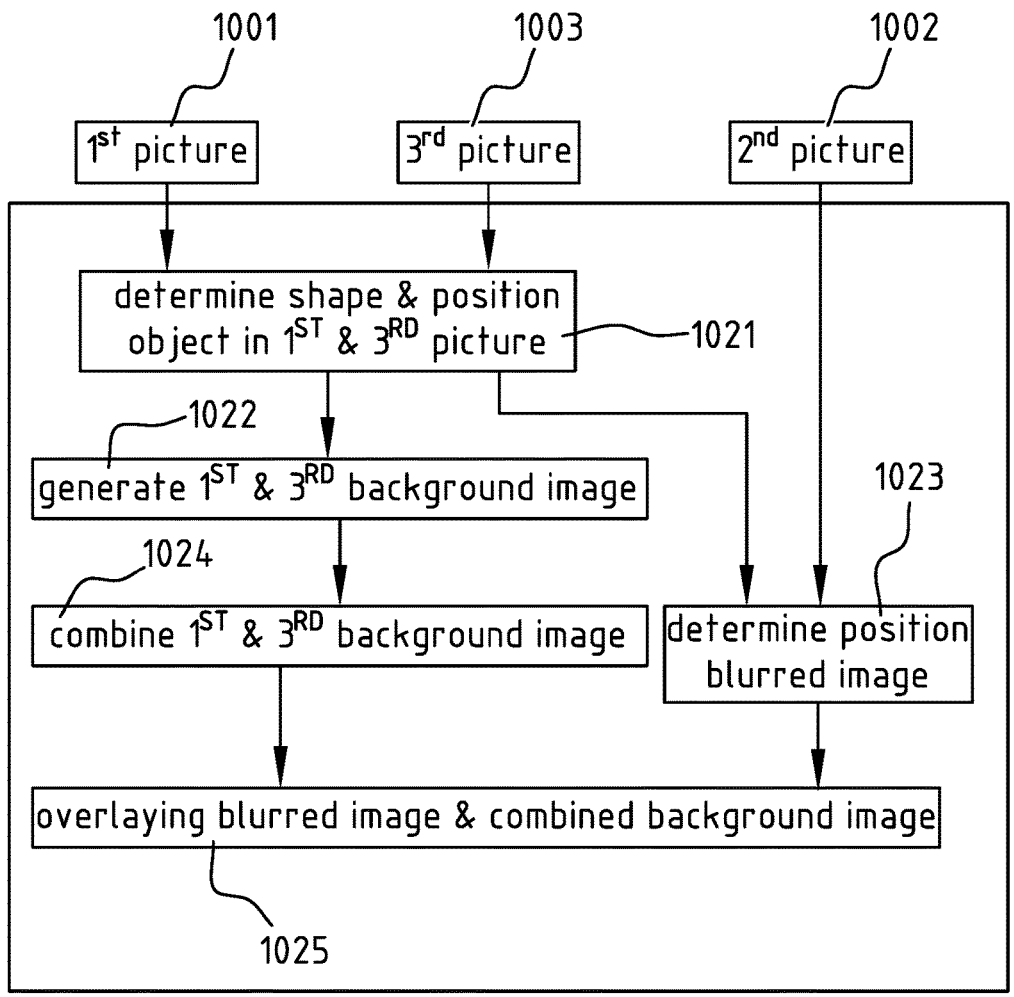
FIG. 10 is a flow chart illustrating an embodiment of the generating step of the method.

FIG. 10 illustrates in detail another exemplary embodiment of the steps that may be performed for generating of the final image. In this embodiment, the step 1020 for generating the final image comprises a first step 1021 for determining a shape and position of the object using stitching based on the object, using the first and the third picture 1001, 1003; a second step 1022 for generating a first and third background image by removing the object from said first and said third picture taking into account the determined shape and position; a third step 1024 for combining said first and third background image to obtain a combined background image; a step 1023 for determining the position of an optionally blurred image of the object in the second picture 1002, using the determined position in the first and third picture to; and a final styp 1025 for overlaying the optionally blurred image of the second picture on said combined background image taking into account the position of the optionally blurred portion in the second picture, in order to obtain the final image.

Figure 11:
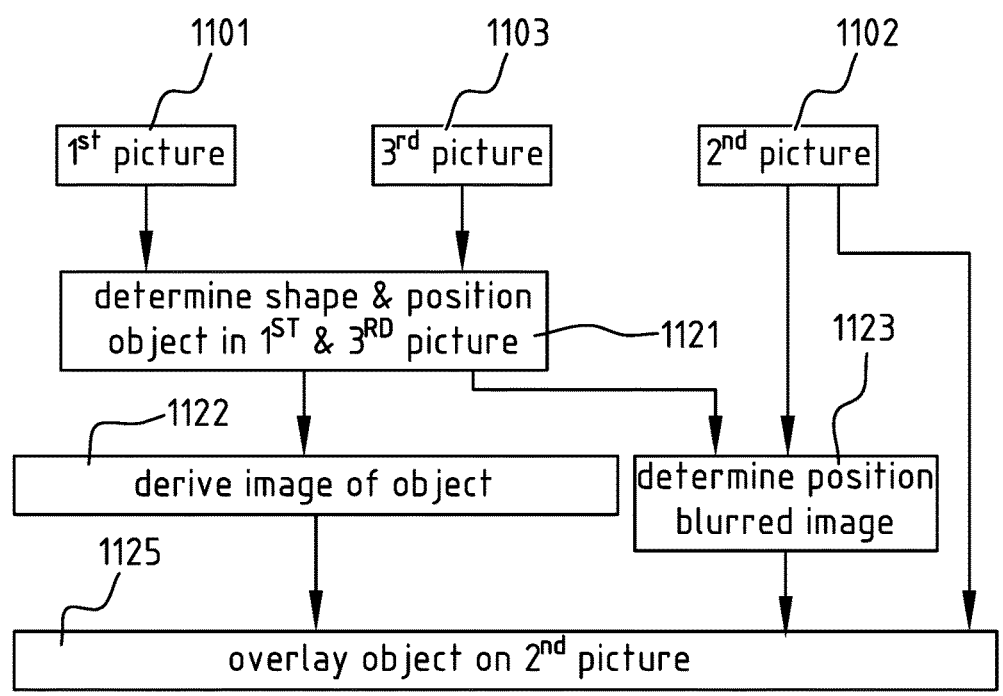
FIG. 11 is a flow chart illustrating an embodiment of the generating step of the method.

FIG. 11 illustrates in detail another exemplary embodiment of the steps that may be performed for generating of the final image. In this embodiment, the step 1120 for generating the final image comprises a first step 1121 for generating a shape and position of the object using stitching based on the object using the first and the third picture 1101, 1103; a second step 1122 for deriving a non-blurred image of the object from said first and/or said third picture; a step 1123 for determining the position of an optionally blurred image of the object in the second picture 1102, using the determined position in said first and third picture; a final step 1125 of overlaying the non-blurred image of the object on the second picture taking into account the determined position of the optionally blurred image of the object in the second picture, in order to obtain the final image.

In embodiments of the invention two final images may be generated, e.g. a first final image according to the embodiment of FIG. 9 or 10, which is particularly suitable for a moving object with a stable background, and a second final image according to the embodiment of FIG. 11, which is particularly suitable for a moving background. A user may then be presented with both the first and second final image and may choose the best one. In an alternative embodiment, the user may be presented with a selection interface for selecting a "moving object" mode or a "moving background" mode, whereupon the final image is calculated accordingly. The user interface 605 of FIG. 6 may then comprise such a selection interface.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media.

The embodiments are also intended to cover computers programmed to perform said steps of the above-described methods.

The functions of the various elements shown in the figures, including any functional blocks labelled as "controllers" or "modules", may be provided through the use of dedicated hardware as well as hardware capable of executing software in association with appropriate software. When provided by a controller or processor, the functions may be provided by a single dedicated controller, by a single shared controller, or by a plurality of individual controllers, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Whilst the principles of the invention have been set out above in connection with specific embodiments, it is to be understood that this description is merely made by way of example and not as a limitation of the scope of protection which is determined by the appended claims.

The invention claimed is:

1. Method for obtaining an image containing a portion with motion blur, comprising:
    controlling at least one camera to take a first, second and third picture in a determined order of an object and a background, such that said first picture is taken with a first exposure time, said second picture with a second exposure time, and said third picture with a third exposure time, said second exposure time being longer than said first and said third exposure time, such that said second picture contains a blurred image of the background and/or the object if said object and/or said background is moving with respect to said at least one camera;
    generating a final image containing at least a portion of said blurred image of the second picture as well as a portion derived from said first and/or third picture using said first, second and third picture,
    wherein generating of the final image comprises:
    using the first and the third picture to determine a shape and a position of the object in said first and said third picture;
    isolating the at least a portion of the blurred image from the second picture, using the position and shape of the object in the first and third picture; and
    combining the isolated at least a portion of the blurred image with a portion derived from the first and/or third picture to obtain the final image.

2. The method of claim 1, wherein the controlling comprises controlling a single camera to take the first, second and third picture, such that the first, second and third pictures are taken one after the other.

3. The method of claim 1, wherein the controlling comprises controlling the at least one camera to take the third picture after the second picture, and the second picture after the first picture.

4. The method of claim 1, wherein the first and third exposure time are smaller than $\frac{1}{100}$ s, and the second exposure time is larger than $\frac{1}{80}$ s.

5. A first apparatus, comprising:
    at least one processor; and
    at least one memory including computer program code;
    the at least one memory and the computer program code configured to, with the at least one processor, cause the first apparatus at least to perform:
    receiving at least a first, second and third picture taken with at least one camera in a determined order of an object and a background, wherein said first picture is taken with a first exposure time, said second picture with a second exposure time, and said third picture with a third exposure time, said second exposure time being longer than said first and said third exposure time, such that said second picture contains a blurred image of the background and/or the object if said object and/or said background is moving with respect to said at least one camera;
    generating a final image containing at least a portion of said blurred image of the second picture as well as a portion derived from said first and/or third picture using said first, second and third picture, wherein generating of the final image comprises:
using the first and the third picture to determine a shape and a position of the object in said first and said third picture;
isolating the at least a portion of the blurred image from the second picture, using the position and shape of the object in the first and third picture; and
combining the isolated at least a portion of the blurred image with a portion derived from the first and/or third picture to obtain the final image.

6. The method of claim 1, wherein the controlling comprises controlling the at least one camera to take the first and third pictures before the second picture, or the first and third pictures after the second picture;
wherein the first and third picture are used to determine a speed of the object with respect to the at least one camera;
wherein the speed is used to determine the position of the blurred image in the second picture.

7. The first apparatus of claim 5, wherein the at least one memory and the computer program code are configured to, with the at least one processor, cause the at least to perform:
using the first and the third picture to determine a shape and position of the object using stitching based on the object;
deriving a background image from said first and/or third pictures using the determined shape and/or position of the object in the first and/or third picture;
using the determined position in the first and third picture to determine the position of an optionally blurred image of the object in the second picture; and
overlaying the optionally blurred image of the second picture on said background image taking into account the position of the optionally blurred portion in the second picture, in order to obtain the final image.

8. The first apparatus of claim 5, wherein the at least one memory and the computer program code are configured to, with the at least one processor, cause the first apparatus at least to perform:
using the first and the third picture to determine a shape and position of the object using stitching based on the object;
removing the object from said first and said third picture taking into account the determined shape and position in order to generate a first and third background image;
combining said first and third background image to obtain a combined background image;
using the determined position in the first and third picture to determine the position of an optionally blurred image of the object in the second picture; and
overlaying the optionally blurred image of the second picture on said combined background image taking into account the position of the optionally blurred portion in the second picture, in order to obtain the final image.

9. The first apparatus of claim 5, wherein the at least one memory and the computer program code are configured to, with the at least one processor, cause the first apparatus at least to perform:
using the first and the third picture to generate a shape and position of the object using stitching based on the object;
deriving a non-blurred image of the object from said first and/or said third picture;
using the determined position in said first and third picture to determine the position of an optionally blurred image of the object in the second picture;
overlaying the non-blurred image of the object on the second picture taking into account the determined position of the optionally blurred image of the object in the second picture, in order to obtain the final image.

10. A non-transitory computer readable medium comprising program instructions for causing an apparatus to perform at least a method of:
controlling at least one camera to take a first, second and third picture in a determined order of an object and a background, such that said first picture is taken with a first exposure time, said second picture with a second exposure time, and said third picture with a third exposure time, said second exposure time being longer than said first and said third exposure time, such that said second picture contains a blurred image of the background and/or the object if said object and/or said background is moving with respect to said at least one camera;
generating a final image containing at least a portion of said blurred image of the second picture as well as a portion derived from said first and/or third picture using said first, second and third picture,
wherein generating of the final image comprises:
using the first and the third picture to determine a shape and a position of the object in said first and said third picture;
isolating the at least a portion of the blurred image from the second picture, using the position and shape of the object in the first and third picture; and
combining the isolated at least a portion of the blurred image with a portion derived from the first and/or third picture to obtain the final image.

11. A second apparatus comprising:
at least one camera;
at least one processor; and
at least one memory including computer program code;
the at least memory and the computer program code configured to, with the at least one processor, cause the second apparatus at least to perform:
controlling the at least one camera to take a first, second and third picture, in a determined order, of an object and a background, such that said first picture is taken with a first exposure time, said second picture with a second exposure time, and said third picture with a third exposure time, said second exposure time being longer than said first and said third exposure time, such that said second picture contains a blurred image of the background and/or the object if said object and/or said background is moving with respect to said at least one camera;
the second apparatus further comprising the first apparatus of claim 5.

12. The second apparatus of claim 11, wherein the at least one memory and the computer program code are configured to, with the at least one processor, cause the second apparatus at least to perform controlling a single camera to take the first, second and third picture, such that the first, second and third pictures are taken one after the other.

13. The second apparatus of claim 11, wherein the at least one memory and the computer program code are configured to, with the at least one processor, cause the second apparatus at least to perform controlling the at least one camera to take the first and third picture with a first and third exposure time which are smaller than $1/100$ s; and for taking the second picture with a second exposure time which is larger than $1/80$ s.

14. The second apparatus of claim 11: wherein the at least one memory and the computer program code are configured to, with the at least one processor, cause the second apparatus at least to perform controlling the at least one camera to take the third picture after the second picture, and the second picture after the first picture.

15. The second apparatus of claim 11, wherein the at least one memory and the computer program code are configured to, with the at least one processor, cause the second apparatus at least to perform controlling the at least one camera to take the first and third pictures before the second picture, or the first and third pictures after the second picture.

16. The second apparatus of claim 11, wherein the at least one memory and the computer program code are configured to, with the at least one processor, cause the second apparatus at least to perform controlling the at least one camera to take the first and third pictures before the second picture, or the first and third picture after the second picture;
    wherein the first and third pictures are used to determine a speed of the object with respect to the at least one camera;
    wherein the speed is used to determine the position of the blurred image in the second picture.

\* \* \* \* \*